United States Patent [19]

Latham-Brown et al.

[11] Patent Number: 5,193,118
[45] Date of Patent: Mar. 9, 1993

[54] VEHICULAR SOUND REPRODUCING

[75] Inventors: Ernest Latham-Brown, Framingham; Brian J. Gawronski, Northboro; Peter W. Hubbe, Marlboro, all of Mass.

[73] Assignee: Bose Corporation, Framingham, Mass.

[21] Appl. No.: 842,743

[22] Filed: Feb. 27, 1992

Related U.S. Application Data

[63] Continuation of Ser. No. 380,924, Jul. 17, 1989, abandoned.

[51] Int. Cl.⁵ .............................................. H04B 1/00
[52] U.S. Cl. ......................................... 381/86; 381/24
[58] Field of Search ....................... 381/86, 88, 90, 89, 381/188, 205; 181/144

[56] References Cited

U.S. PATENT DOCUMENTS

| | | | |
|---|---|---|---|
| 4,085,289 | 4/1978 | Schmideler | 381/86 |
| 4,144,416 | 3/1979 | Babb | 381/158 |
| 4,549,631 | 10/1985 | Bose | 181/160 |
| 4,567,959 | 2/1986 | Prophit | 381/86 |
| 4,574,391 | 3/1986 | Morishima | 381/18 |
| 4,648,117 | 3/1987 | Kunungi et al. | 381/86 |

FOREIGN PATENT DOCUMENTS

| | | |
|---|---|---|
| 0284286 | 9/1988 | European Pat. Off. . |
| 3028610 | 2/1982 | Fed. Rep. of Germany . |
| 8701475 | 4/1987 | Fed. Rep. of Germany . |
| 7711085 | 11/1978 | France . |
| 55-46646 | 4/1980 | Japan . |
| 55-73197 | 6/1980 | Japan . |

OTHER PUBLICATIONS

DAK Catalog, Oct. 1987, 15" Thundering Subwoofer, p. 39 (DAK Industries, Inc., Canoga Park, Calif. 91304).

Primary Examiner—Forester W. Isen
Attorney, Agent, or Firm—Fish & Richardson

[57] ABSTRACT

A vehicle sound reproducing system including four driver units that radiate in at least the upper frequency range and are located in respective front and rear, left and right side panels. Also, disclosed is a nonlocalizable woofer module placed below a front seat of the vehicle.

11 Claims, 2 Drawing Sheets

VEHICULAR SOUND REPRODUCING

This is a continuation of application Ser. No. 07/380,924, filed Jul. 17, 1989, now abandoned.

BACKGROUND OF THE INVENTION

The present invention relates to sound reproducing in vehicles.

High fidelity sound reproducing systems for motor vehicles have met wide acceptance. Speakers are typically mounted in the dashboard, the rear package shelf (often larger, bass-producing modules are flush-mounted here and extend into the trunk space or extend above the shelf), and/or the doors. Single drivers have been mounted in forward lower corners of front and rear doors. When mounted in the rear package shelf, the sound sometimes overpowers passengers sitting in rear seats.

SUMMARY OF THE INVENTION

In one aspect, the invention features in general a vehicle sound reproducing system that includes front and rear, left and right driver units that radiate in at least the upper frequency range and are located in lower portions of respective front and rear, left and right side panels and a woofer module that is nonlocalizable (i.e., the location of the woofer module cannot easily be determined by listening) and is preferably placed under a seat. This desirably provides balanced, uniform sound to both front and rear passengers. Otherwise unused space is thus advantageously used for the woofer module (which often takes up a large amount of space), and the origin of the sound is not apparent to the listener. This arrangement provides good bass reproduction and minimal impact on styling in the car.

In another aspect, the invention features in general a motor vehicle sound reproducing system that includes a nonlocalizable woofer module with an opening in the vehicle passenger enclosure and upper frequency driver units located in lower portions of the side panels on both sides of the vehicle. Because the woofer is nonlocalizable, it can be physically located anywhere that is convenient without seriously affecting bass reproduction. The placement of the upper frequency driver units in lower portions of side panels is advantageous in providing balanced amounts of sound from each upper frequency driver unit to a listener, as the proximity of a listener sitting closer to one side panel to the upper frequency unit in that side panel will be offset by the more direct positioning of that listener with respect to the upper frequency driver unit in the other side panel.

A nonlocalizable woofer module is defined here as a woofer module characterized by a far-field pressure frequency response that is at least three (3) decibels (dB) down at a high break frequency of at most 300 Hz from the break frequency and has a substantial response at least as low as 80 Hz while the response progressively decreases above the higher break frequency, preferably at a rate at least as steep as 12 dB per octave. A lower high break frequency of 200 Hz for the at least 3 dB down high break frequency is better and 150 Hz preferred.

The upper frequency drivers radiate energy having audible spectral components at least in a frequency range above a frequency just below the high break frequency of the nonlocalizable woofer module.

Other advantages and features of the invention will be apparent from the following detailed description and from the claims when read in connection with the accompanying drawings in which:

Figure 1:
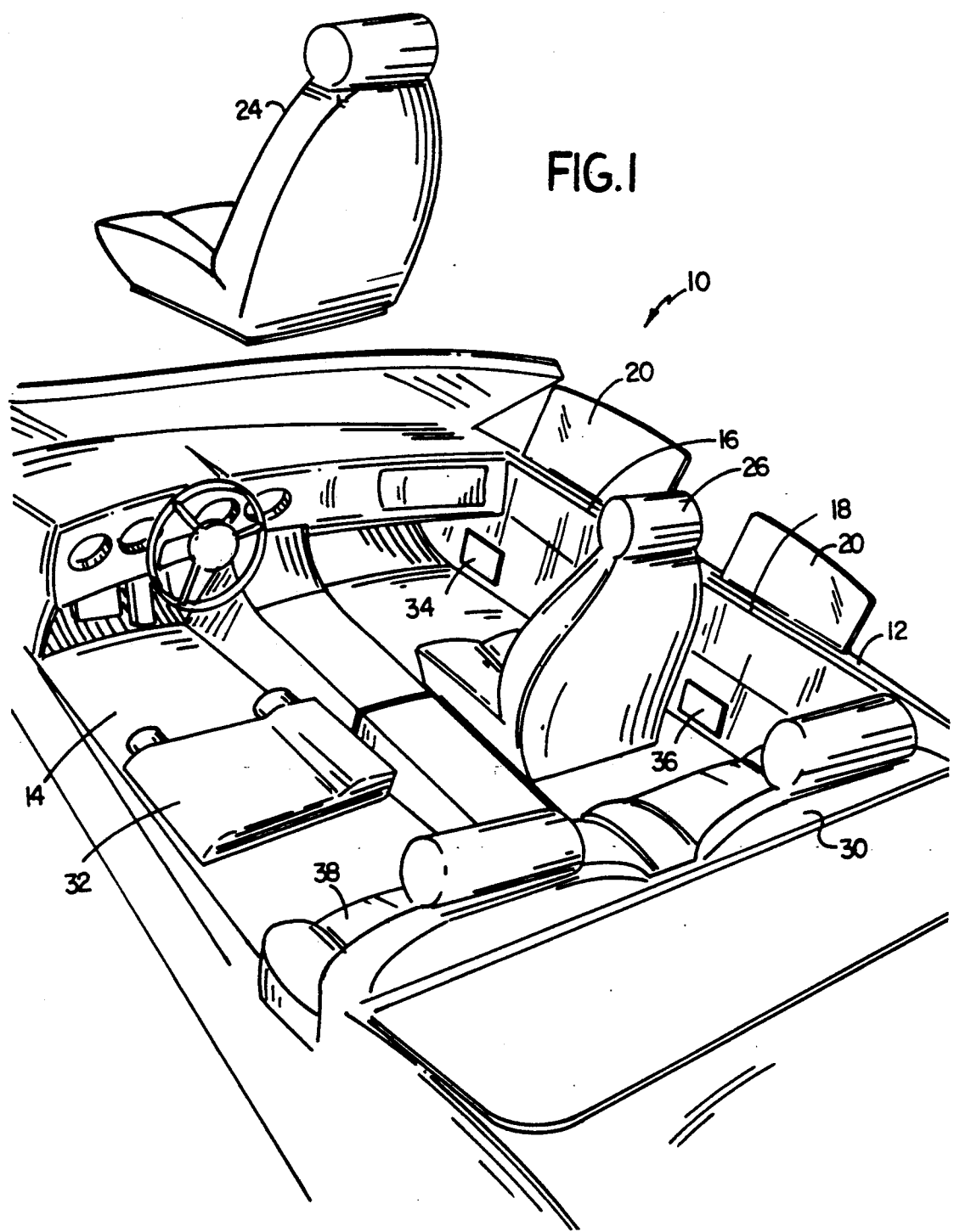
FIG. 1 is a partial, diagrammatic, perspective view, partially exploded, of a motor vehicle including a sound reproduction system according to the invention.

Referring to FIG. 1, vehicle body 12 of motor vehicle 10 includes floor 14 and front and rear, left and right side panels; only front right side panel 16 and rear right side panel 18 are shown in FIG. 1. Above the side panels are windows 20. Floor 14, the front and rear, left and right side panels, and the windows partially define a passenger enclosure. Front left seat 24, front right seat 26, left rear seat 28, and right rear seat 30 are all located in the passenger enclosure. Beneath left front seat 24 is nonlocalizable woofer module 32, shown in detail in FIG. 2. In each of the front and rear, left and right side panels are respective upper frequency driver units; only front right upper frequency driver unit 34 and rear right upper frequency driver unit 36 are shown in FIG. 1; identical upper frequency driver units are in the front and rear left side panels in locations which are the mirror images of the locations of driver units 34 and 36.

Figure 2:
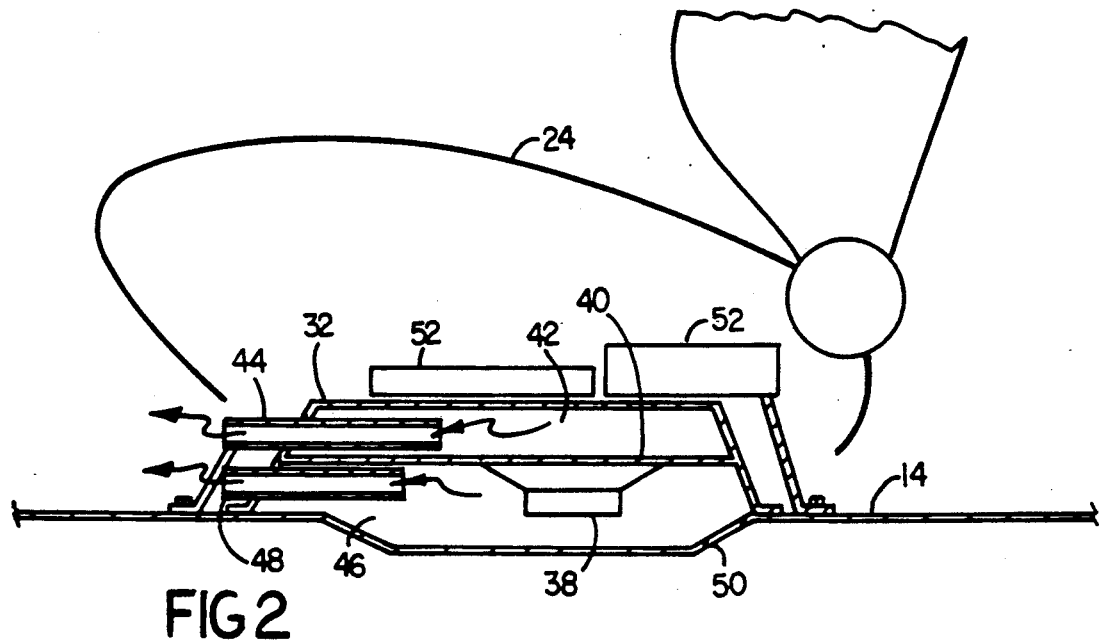
FIG. 2 is a diagrammatic, vertical elevation view showing the mounting of a woofer module under a seat of the FIG. 1 vehicle.

Referring to FIG. 2, nonlocalizable woofer module 32 is located underneath left front seat 24 and in a specific embodiment includes a 6.5 inch low-frequency driver 38 that is mounted on partition 40, which divides the enclosure of module 32 into two chambers. Upper chamber 42 has a volume of substantially 400 in.$^3$ and a 12 inch long, two-inch diameter tube 44, and lower chamber 46 has a volume of substantially 200 in.$^3$ and a six-inch long, two-inch diameter tube 48 in this embodiment. Floor 14 is depressed at depression 50 to provide additional volume for woofer module 32. Seat adjustment mechanisms 52 are located on top of module 32. The structure and operation of woofer module 32 is described in additional detail in U.S. Pat. No. 4,549,631, which is hereby incorporated by reference. (A stereo system that similarly uses a nonlocalizable ported woofer module is described in Hirsh, J., "Bose AM-5 Speaker System," Stereo Review, April 1987, which is hereby incorporated by reference.)

Figure 3:
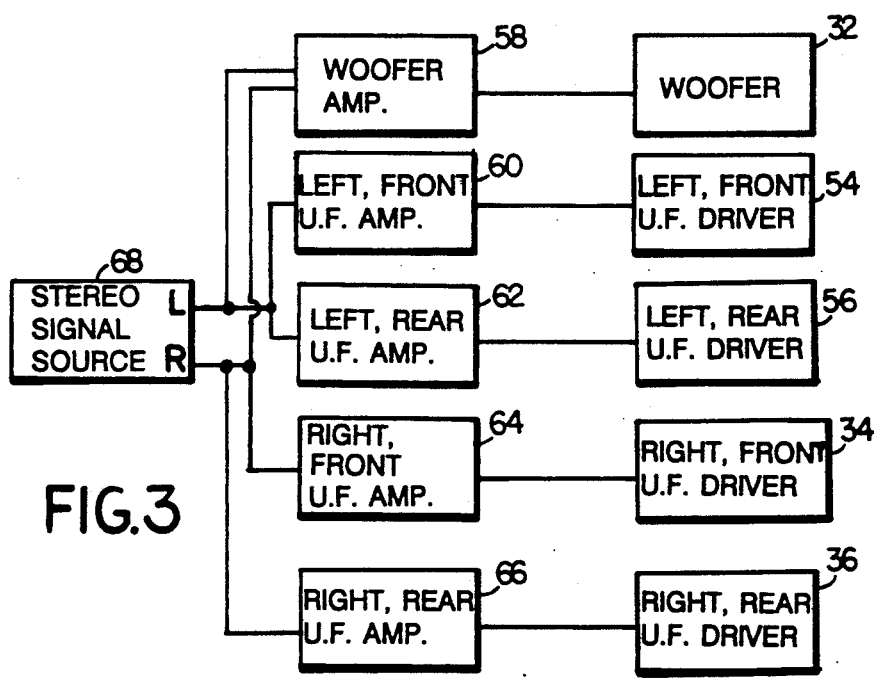
FIG. 3 is a block diagram showing components of the FIG. 1 vehicle sound reproducing system.

Referring to FIG. 3, woofer module 32, left front upper frequency driver unit 54, left rear upper frequency driver unit 56, right front upper frequency driver unit 34, and right rear upper frequency driver unit 36 are connected to be driven by respective amplifiers 58, 60, 62, 64, 66. Woofer amplifier 58 receives and combines the left and right signals from the stereo signal source 68 (e.g., a cassette player, an FM tuner, or a CD player). Left front and rear upper frequency amplifiers 60, 62 receive the left stereo signal from source 68, and right front and rear upper frequency amplifiers 64, 66 receive the right stereo signal from source 68.

OPERATION

In operation, upper frequency driver units 34, 36, 54, 56 provide the mid and high frequency spectral components typically above 150 Hz, and nonlocalizable woofer module 32 provides the low frequency spectral components typically below a high break frequency of 150 Hz. That is to say, nonlocalizable woofer module 32 provides to the passenger enclosure low frequency spectral components of frequencies lower than those provided by the upper frequency driver units.

It is preferred that this high break frequency be no greater than 300 Hz, and that spectral components above are not radiated by the nonlocalizable woofer. 200 Hz is better and 150 Hz is preferred for this high break frequency.

Nonlocalizable woofer module 32 operates as described in the '631 patent and Hirsh article, port tubes 44, 48 comprising acoustic masses that resonate with the compliance of air in the respective subchambers 42, 46 to establish a high break frequency sufficiently low and the decrease in response sufficiently sharp so that the sound provided by nonlocalizable woofer module 32 is essentially nonlocalizable. This decrease in response above the high break frequency is preferably at least 12 dB per octave. Listeners thus cannot easily identify the location of the woofer module, and the otherwise unused space underneath the seat is advantageously used for the woofer. This arrangement provides good bass reproduction free of audible distortion and minimal impact on styling of the car.

Other woofers may also be used, especially when under the car seat. For example, the loudspeaker described in Bose U.S. Pat. No. 4,628,528 is another example of a woofer in which the loudspeaker diaphragm is inside the woofer enclosure and not in contact with the air or other acoustical medium outside the enclosure. In both of these examples the structure coupling the loudspeaker drivers to the acoustical medium outside the enclosure defines an acoustical transmission path characterized by parameters for establishing a predetermined transfer function between the driver and the interior of the vehicle. A conventional woofer mounted on an outside baffle with its diaphragm contacting the acoustical medium outside the enclosure may also be used. It is believed that the high break frequency with the woofer enclosure under the seat may be as high as 300 Hz and remain essentially nonlocalizable in a vehicle.

The placement of the upper frequency driver units in the lower portions of side panels is advantageous in providing balanced amounts of sound from left and right upper frequency driver units to a listener. This balance is achieved because each driver unit has its direction of maximum radiation toward the far listening position and radiates significantly less energy in the direction toward the near listening position. Also, the use of upper frequency driver units in the respective front and rear, left and right side panels desirably provides balanced uniform sound to both the front and rear passengers.

OTHER EMBODIMENTS

Other embodiments of the invention are within the scope of the following claims. For example, nonlocalizable woofer module 32 could employ other passive radiators (e.g., drone cones) in place of port tubes 44, 48 and can be of the type that includes an acoustic waveguide as described in U.S. Pat. No. 4,628,528, which is hereby incorporated by reference. Nonlocalizable woofer module 32 could also embody other technology that provides acoustic low pass filtering such as to render it nonlocalizable. Also, nonlocalizable woofer module 32 could be located under a back seat under the rear deck, in the trunk or otherwise outside of the passenger enclosure, so long as it had an opening or acoustically transparent path to the passenger enclosure, noting that said path may traverse (without visible modification or perforation) such existing automobile interior/exterior walls or surfaces such as rear package shelves, which can be (to a greater or lesser extent) transparent to low frequency radiation, and an additional nonlocalizable woofer module could be located under the other front seat.

What is claimed is:

1. A vehicle with sound reproducing apparatus comprising
    a vehicle body including a floor and front and rear, left and right side panels and windows above said side panels to partially define a passenger enclosure,
    front seats and rear seats having seating surfaces in said passenger enclosure,
    four upper frequency driver units that radiate in at least the upper frequency range and are located in lower portions of respective said front and rear, left and right side panels
    wherein said front upper frequency driver units are located forward of and below the front passenger seats seating surfaces, and said rear upper frequency driver units are located forward of and below the rear passenger seats seating surfaces, and
    a nonlocalizable woofer module acoustically coupled to said passenger enclosure that provides to said passenger enclosure low frequency spectral components of frequencies lower than those provided by the upper frequency driver units.

2. The apparatus of claim 1 wherein said upper frequency driver units are completely located below the location half-way between the floor and windows.

3. The apparatus of claim 1 wherein said nonlocalizable woofer module is located underneath a front seat.

4. The apparatus of claim 1 wherein said nonlocalizable woofer module is characterized by a frequency response having a high break frequency at least as low as 200 Hz.

5. The apparatus of claim 1 wherein said nonlocalizable woofer module is characterized by a frequency response having a high break frequency at least as low as 150 Hz.

6. The apparatus of claim 1 wherein said nonlocalizable woofer module is characterized by a frequency response having a decrease in frequency response above a high break frequency at least as steep as 12 dB per octave.

7. The apparatus of claim 4 wherein said nonlocalizable woofer module is characterized by a frequency response having a decrease in frequency response above a said high break frequency at least as steep as 12 dB per octave.

8. The apparatus of claim 5 wherein said nonlocalizable woofer module is characterized by a frequency response having a decrease in frequency response above a said high break frequency at least as steep as 12 dB per octave.

9. The apparatus of claim 1 wherein said woofer module comprises an enclosure in contact with the acoustical medium inside said vehicle with a loudspeaker driver inside said enclosure out of contact with the acoustical medium outside said enclosure coupled by structure coupling the loudspeaker driver to the acoustical medium outside said enclosure defining an acoustical transmission path characterized by parameters for establishing a predetermined transfer function between the loudspeaker driver and the interior of the vehicle.

10. The apparatus of claim 3 wherein said woofer module comprises an enclosure in contact with the acoustical medium inside said vehicle with a loudspeaker driver inside said enclosure out of contact with the acoustical medium outside said enclosure coupled by structure coupling the loudspeaker driver to the acoustical medium outside said enclosure defining an acoustical transmission path characterized by parameters for establishing a predetermined transfer function between the loudspeaker driver and the interior of the vehicle.

11. The apparatus of claim 1 wherein said woofer module comprises a nonlocalizable woofer module located in the vehicle trunk under the rear deck with an opening in the passenger enclosure.

* * * * *